United States Patent [19]

Lipton

[11] Patent Number: 5,111,772
[45] Date of Patent: May 12, 1992

[54] BIRD FOOD DISPENSING SYSTEM WITH SQUIRREL PROOF HOUSING

[76] Inventor: Leslie Lipton, The Round, 42 Dene Road, Northwood, Middlesex HA6 2DA, England

[21] Appl. No.: 651,066

[22] Filed: Feb. 6, 1991

[51] Int. Cl.⁵ ............................................. A01K 5/00
[52] U.S. Cl. .................................................... 119/579
[58] Field of Search ............... 119/57.9, 57.8, 52.3, 119/52.4, 63

[56] References Cited

U.S. PATENT DOCUMENTS

| | | | |
|---|---|---|---|
| 963,968 | 7/1910 | Whitney | 119/52.4 |
| 1,113,887 | 10/1914 | De George et al. | 119/52.4 |
| 1,877,890 | 9/1932 | Kielsmeier | 119/77 |
| 2,383,732 | 8/1945 | Niersbach | 119/52.4 |
| 3,788,279 | 1/1974 | Boehland, Jr. | 119/52 R |
| 3,866,576 | 2/1975 | Downing | 119/18 |
| 4,144,842 | 3/1979 | Schlising | 119/63 |
| 4,216,742 | 8/1980 | Kirchhofer | 119/18 |
| 4,434,745 | 3/1984 | Perkins et al. | 119/57.9 |

FOREIGN PATENT DOCUMENTS 1589758  3/1978  United Kingdom ............. 119/18

*Primary Examiner*—Gene Mancene
*Assistant Examiner*—Thomas Price
*Attorney, Agent, or Firm*—Kenyon & Kenyon

[57] ABSTRACT

A housing (1) for a food dispenser (8) for birds has a band (10) of contiguous apertures (11) which are elongated transversely of the band. Each aperture (11) has a width of 2 to 4 cm over at least a 5 cm length thereof. The apertures (11) enable small birds to enter the enclosed space (14) inside the housing (1) in order to eat from the food dispenser (8). The apertures (11) are however too small to permit squirrels to gain entry. Because the apertures (11) are in a band (10), the birds are less likely to feel trapped inside the housing (1).

19 Claims, 3 Drawing Sheets

BIRD FOOD DISPENSING SYSTEM WITH SQUIRREL PROOF HOUSING

This invention relates to a housing for a food dispenser for birds and to a food dispensing system comprising a housing and food dispenser.

Whilst food dispensers serve the purpose of feeding the birds, they are also prone to attack by squirrels who are capable of breaking into the food dispenser.

There is a known food dispenser that is sold with an integral protective outer housing of fine wire mesh. A number of separate entry/exit holes each approximately 3 cm in diameter are provided in the mesh walls of the housing so as to permit small birds to gain access to the space within the housing and therefore be able to eat the nuts or the like contained within the food dispenser. Because the outer housing is made of fine wire mesh, the birds have to use the entry/exit holes and experience has shown that they are reluctant to do this, perhaps because, once inside the housing, they feel confined and unable to make a quick departure.

According to a first aspect of the present invention, there is provided a housing for a food dispenser for birds, the housing defining an enclosed space for the food dispenser, entry into and exit from the enclosed space being provided by a band of contiguous apertures disposed around the housing, the apertures being elongate transversely of the band and each of the apertures having a width of 2 to 4 cm over at least a 5 cm length thereof.

The dimensions of the apertures are such that, whilst they will permit small birds to pass, they are too small to permit a squirrel to pass through. The provision of a band of contiguous apertures ensures that there are many different entry and exit points available for use by the birds. Therefore, a bird, once inside the enclosed space, does not feel trapped and has the impression of merely being in a tree or the like. This is because only a few dividing members between the apertures are necessary to define the apertures in the band of apertures and therefore the band appears to be almost without any impediment to passage. Whilst it is true that the small birds may freely pass in and out, the width is such, as mentioned above, to prevent passage into and out of the enclosed spaced by squirrels.

Preferably, each aperture has a width of 2.5 to 3.5 cm over at least the 5 cm length thereof.

Preferably, the housing has a cylindrical side wall formed as a framework defining only the band of apertures or only a plurality of such bands.

Preferably, the framework has substantially parallel longitudinal and circumferential bars.

Preferably, the housing includes mounting means for mounting the food dispenser in the enclosed space, the mounting means extending into the enclosed space for holding the food dispenser out of contact with the parts of the housing that define the periphery of the enclosed space. By spacing the food dispenser away from the walls of the housing, a squirrel is not able to break into the food dispenser whilst remaining outside the housing.

Preferably, the housing has a detachable base and the mounting means are positioned on the base. Because the mounting means are positioned on the base, the food dispenser may be removed from the enclosed space for replenishment simply by detaching the base.

Preferably, the mounting means permit detachable mounting of the food dispenser. With this arrangement, the mounting means may be adapted to permit the use of known food dispensers. For example, the wire mesh, cylindrical food dispensers sold in garden centres and the like may be used with the housing.

Preferably, the mounting means comprise a pair of arms projecting upwards from the base and resiliently deformable apart to permit insertion of the food dispenser into or removal of the food dispenser from the mounting means.

According to a second aspect of the present invention, there is provided a food dispensing system for feeding birds, comprising a housing in accordance with the first aspect of the present invention and a food dispenser mounted on the mounting means inside the enclosed space of the housing.

Preferably, the mounting means hold the food dispenser out of contact with the parts of the housing that define the periphery of the enclosed space. This arrangement prevents a squirrel from gaining access to the food in the food dispenser from outside of the housing, e.g. by trying to gnaw directly into the housing or by stretching an arm in through the housing.

According to a third aspect of the present invention, there is provided a food dispensing system for feeding birds, comprising a housing in accordance with the first aspect of the present invention and a food dispenser having a food storage portion located inside the enclosed space and a tubular food supply portion defining a duct which runs from an aperture in the housing to an aperture in the food storage portion. With this arrangement, the food storage portion may be refilled simply by pouring food down the duct of the food supply portion.

Preferably, the food dispenser includes means for selectably obstructing the duct of the tubular food supply portion. This helps to prevent birds from entering the duct and becoming stuck therein. Preferably, the obstructing means comprise a U-shaped member, the arms of which extend across the duct.

Preferably, the food dispenser comprises an elongate cylinder, the bottom part of which comprises the food storage portion and the top part of which comprises the tubular food supply portion. This is a particularly simple and effective construction for the food dispenser.

Preferably, the elongate cylinder is disposed along a vertical central axis of the enclosed space. This feature ensures that the food dispenser is approximately the same distance from all of the entry/exit apertures and that therefore no entry/exit aperture makes it particularly easy for a squirrel to reach in to attack the food dispenser.

Preferably, at least part of a base wall of the housing also comprises a base wall of the food storage portion of the food dispenser. This feature saves on the amount of material needed to fabricate the food dispensing system.

Preferably, the housing and food dispenser are integral.

Non-limiting embodiments of the present invention will now be described with reference to the accompanying drawings, in which.

Figure 1:
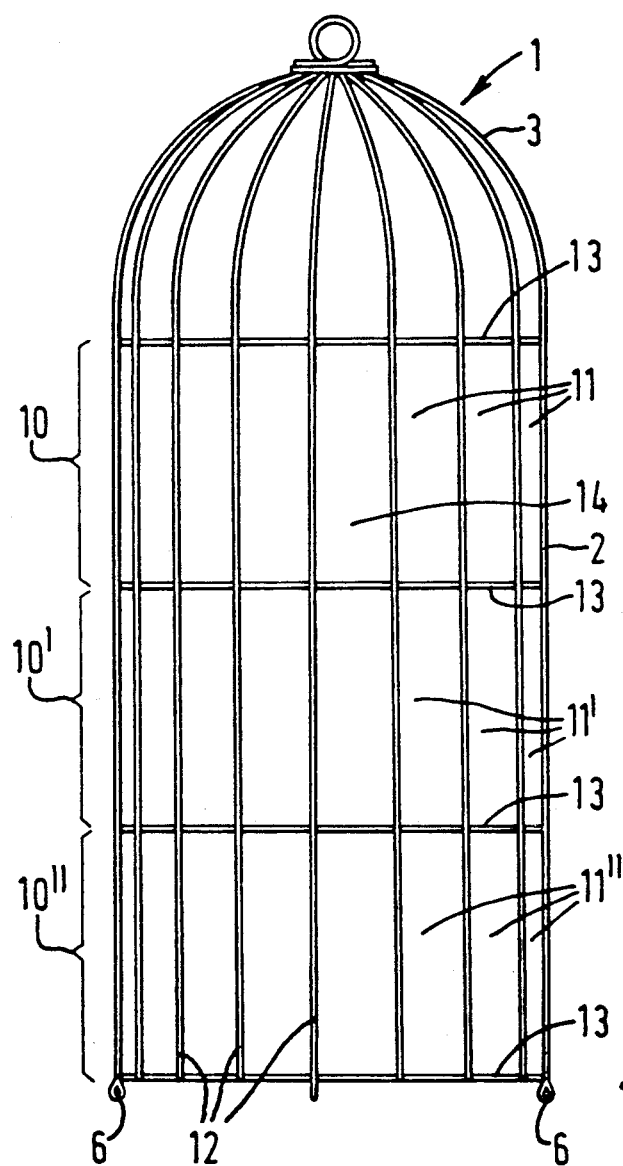
FIG. 1 is a side elevation of a housing in accordance with a first embodiment of the present invention.
Figure 3:
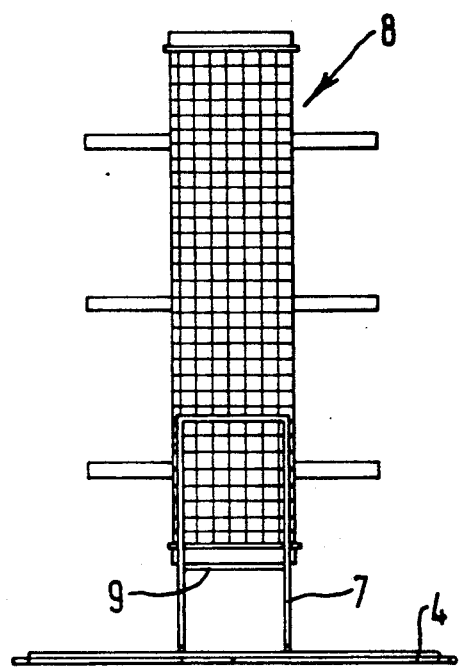
FIG. 3 is a side-view of a removable base of the housing of FIG. 1, with a known food dispenser mounted detachably thereon.
Figure 4:
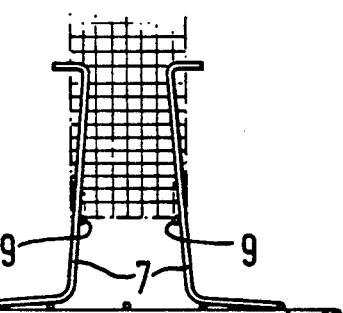
FIG. 4 is a side-view illustrating part of the arrangement of FIG. 3 but viewed from the left-hand side of FIG. 3.
Figure 2:
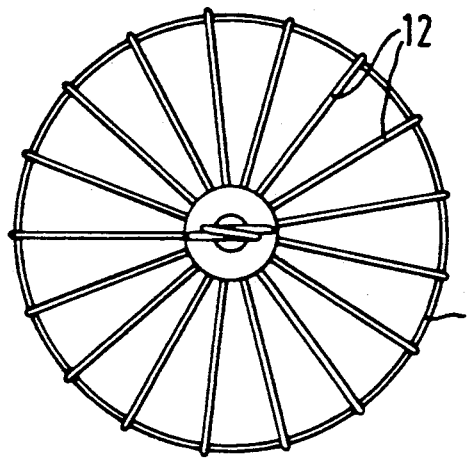
FIG. 2 is a top-plan view of the housing of FIG. 1.

The first embodiment will now be described with reference to FIGS. 1 to 6.

The housing 1 comprises a zinc-coated or nylon-coated framework which includes a generally cylindrical side-wall portion 2, a semi-spherical top wall portion 3 and a detachable, planar base wall portion 4. The base wall portion 4 is provided with a plurality of lugs 5 around its circumference so that by means of a twisting action the base wall portion 4 may be secured to the bottom of the side-wall portion 2 by means of hoops 6.

A pair of arms 7 project upwards from the base wall portion 4 and are resiliently deformable apart so as to permit a known wire mesh nut dispenser 8 to be inserted therebetween and held securely. The arms 7 therefore mount the nut dispenser 8 on the base wall portion 4. In order to space the nut dispenser 8 above the base wall portion 4, the arms 7 include a pair of support struts 9 on which the nut dispenser 8 is seated.

Figure 6:
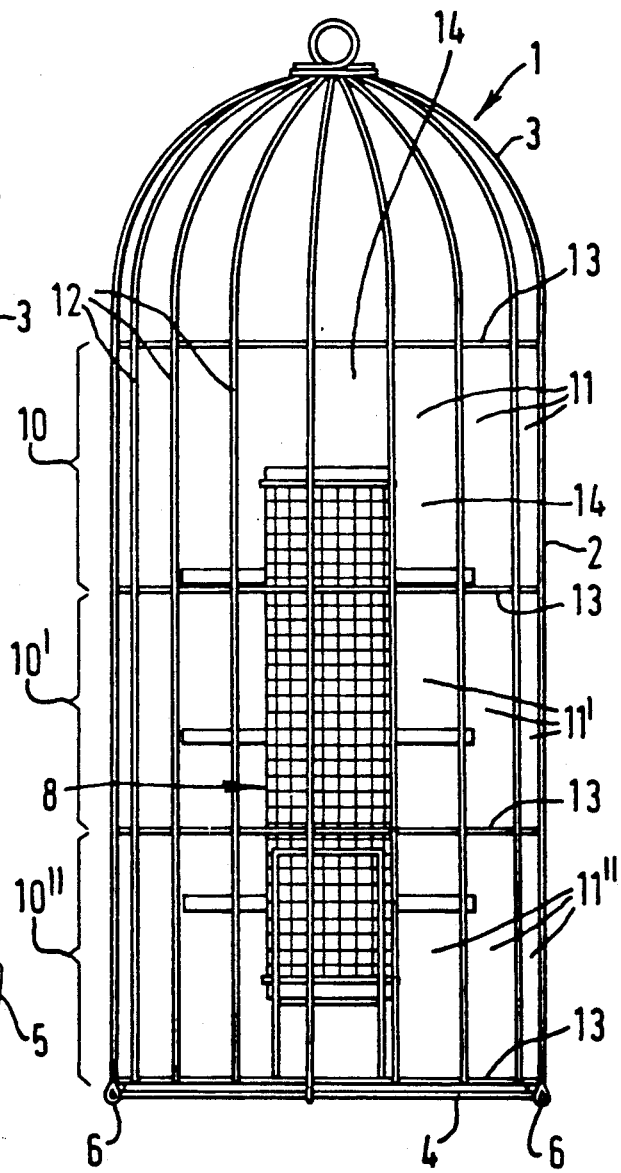
FIG. 6 is a side elevation similar to FIG. 1 but showing the food dispenser inside the enclosed space of the housing.
Figure 5:
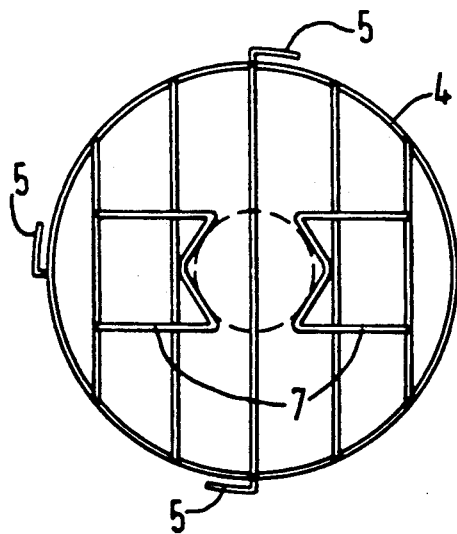
FIG. 5 is a top-plan view of the base of FIGS. 3 and 4, with the known dispenser detached therefrom.

As may be seen from FIG. 6, when the nut dispenser 8 is mounted on the base wall portion 4 and the base wall portion 4 is secured via the lugs 5 and hoops 6 to the bottom of the side wall portion 2, the nut dispenser 8 is held clear of all of the internal wall surfaces of the housing 1. This makes it difficult for squirrels who are unable to get inside the housing 1 to reach through to the nut dispenser 8.

In order to permit small birds to gain entry into the housing 1 whilst preventing squirrels from doing so, the side wall portion 2 is provided with a plurality of bands 10, 10', 10" of contiguous apertures 11, 11', 11" which are elongate transversely of the bands.

The apertures 11, 11', 11" are defined by the vertical bars 12 and horizontal bars 13 which form the framework of the housing 1.

Each aperture 11, 11', 11" is generally rectangular and has a width of 3 cm and a length of approximately 12 cm. The width is sufficient for small birds to gain entry but is too small for squirrels to be able to gain entry into the enclosed space 14 inside the housing 1 and in which the nut dispenser 8 is located.

Figure 7:
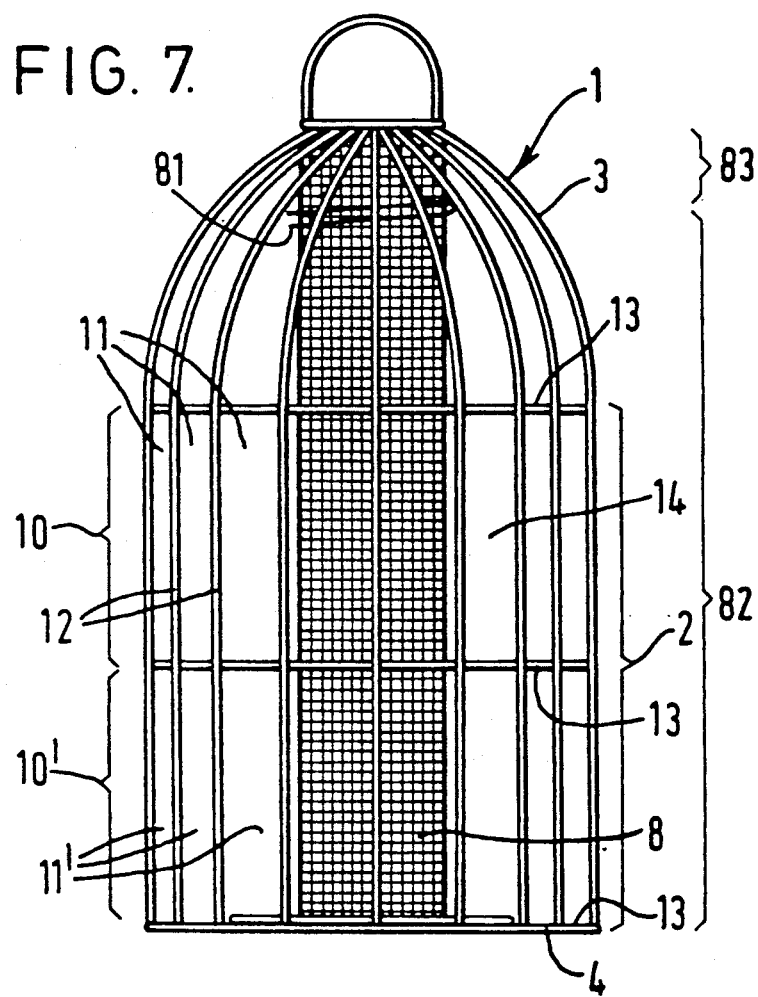
FIG. 7 is a side elevation of a food dispensing system in accordance with a second embodiment of the present invention.
Figure 8:
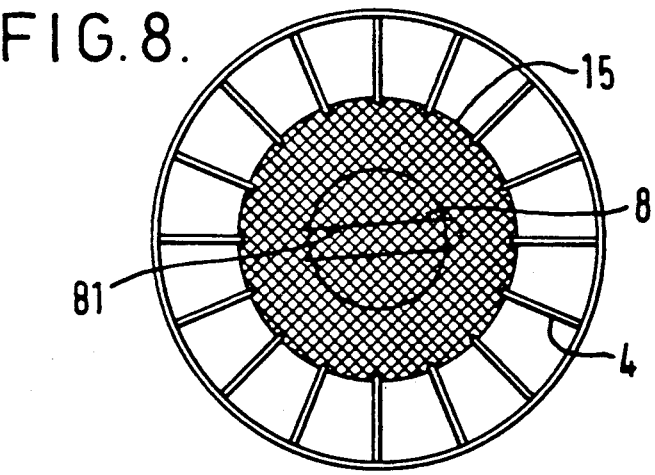
FIG. 8 is an underneath-plan view of the food dispensing system of FIG. 7.

The second embodiment will now be described with reference to FIGS. 7 and 8.

The same reference numerals are used in relation to the second embodiment to identify those components which are common to the first embodiment. The differences between the first and second embodiments are discussed below.

In the second embodiment, the base wall portion 4 is integral with and therefore not detachable from the side-wall portion 2. The nut dispenser 8 is a circular cylinder of wire mesh which extends from the bottom to the top of the housing 1. The nut dispenser 8 in itself has no bottom and is closed at its bottom end by a circular wire mesh portion 15 of the base wall portion 4. The wire mesh portion 15 has a diameter greater than that of the bottom of the nut dispenser 8 in order to provide an annular guard ring around the bottom of the nut dispenser.

At the top of the housing 1 is an aperture within which the open top end of the nut dispenser 8 is located. Nuts may therefore be poured into the nut dispenser 8 in order to fill it. So as to prevent small birds from trying to eat the nuts by entering the top open end of the nut dispenser 8, a U-shaped staple 81 is provided approximately 5 cm below the top end of the dispenser 8. The staple pierces one side of the nut dispenser, crosses the central bore of the nut dispenser and then pierces the other side of the nut dispenser, thereby effectively obstructing the passage along the bore of the nut dispenser.

The part of the nut dispenser 8 below the staple serves as a nut storage portion 82 and the part of the dispenser 8 above the staple serves as a nut supply portion 83 down which nuts may be poured in order to replenish the supply of nuts in the lower part of the nut dispenser.

The nut dispenser 8 is integral with the housing 1.

I claim:

1. A food dispensing system for birds, comprising:
   a food dispenser elongate along a central axis and having a plurality of food dispensing apertures disposed along and around said central axis; and
   a housing encircling said food dispenser so as to define an enclosed space, said housing including at least one band of contiguous entry/exit apertures extending around said housing for providing entry into and exit from the enclosed space,
   said entry/exit apertures being elongate transversely of said band with each of said entry/exit apertures having a width of about 2 to 4 cm over at least about a 5 cm length thereof;
   and wherein said entry/exit apertures are aligned with said food dispensing apertures along lines perpendicular to said central axis.

2. A food dispensing system according to claim 1, wherein each entry/exit aperture has a width of 2.5 to 3.5 cm over at least about a 5 cm length thereof.

3. A food dispensing system according to claim 1, wherein the housing has a cylindrical side wall formed as a framework defining only at least one of the bands of entry/exit apertures.

4. A food dispensing system according to claim 3, wherein the framework has substantially parallel longitudinal and circumferential bars.

5. A food dispensing system according to claim 1, wherein the housing includes mounting means on which the food dispenser is mounted in the enclosed space.

6. A food dispensing system according to claim 5, wherein the housing has a detachable base and the mounting means are positioned on the base.

7. A food dispensing system according to claim 6, wherein the food dispenser is detachably mounted on the mounting means.

8. A food dispensing system according to claim 7, wherein the mounting means comprise a pair of arms projecting upwards from the base and resiliently deformable apart to permit insertion of the food dispenser into or removal of the food dispenser from the mounting means.

9. A food dispensing system according to claim 1, wherein the food dispenser has a food storage portion located below a tubular food supply portion which runs from an aperture in the housing to the food storage portion.

10. A food dispensing system according to claim 9, wherein the food dispenser includes means for selectably obstructing the tubular food supply portion.

11. A food dispensing system according to claim 10, wherein the obstructing means comprise a U-shaped member, the arms of which extend across the tubular food supply portion.

12. A food dispensing system according to claim 9, wherein the food dispenser comprises a cylinder.

13. A food dispensing system according to claim 12, wherein the cylinder is disposed along a vertical central axis of the enclosed space.

14. A food dispensing system according to claim 9, wherein at least part of a base wall of the housing also comprises a base wall of the food storage portion of the food dispenser.

15. A food dispensing system according to claim 9, wherein the housing and food dispenser are integral.

16. A food dispensing system comprising:

a food dispenser; and a housing enclosing said food dispenser so as to define an enclosed space, said housing including at least one band of contiguous entry/exit apertures extending around said housing, and wherein said entry/exit apertures are elongated enough to allow birds to enter the enclosed space and are narrow enough to prevent entrance by larger animals.

17. A food dispensing system according to claim 16 wherein the entry/exit apertures have a width of about 2 to 4 cm over at least about a 5 cm length.

18. A food dispensing system according to claim 16 wherein the food dispenser is elongate along a central axis and has a plurality of food dispensing apertures disposed along and around said central axis.

19. A food dispensing system according to claim 18 wherein the entry/exit apertures are aligned with the food dispensing aperatures along lines perpendicular to the central axis.

* * * * *